Oct. 24, 1972
R. DAVIS
3,700,411
GAS ANALYZER
Filed April 30, 1971
3 Sheets-Sheet 1
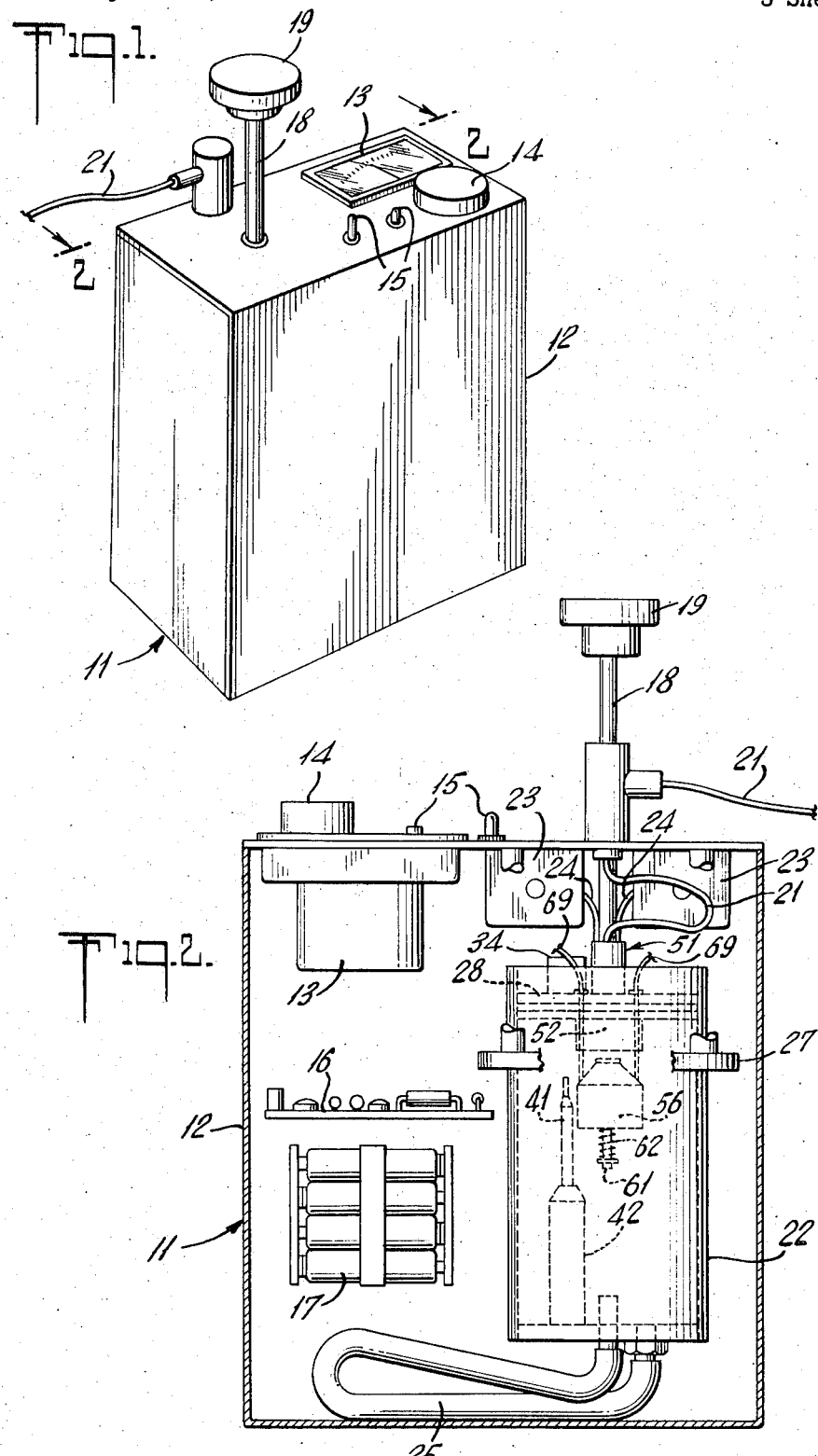
INVENTOR
ROBERT DAVIS
BY
Blum, Moscovitz, Friedman & Kaplan
ATTORNEYS

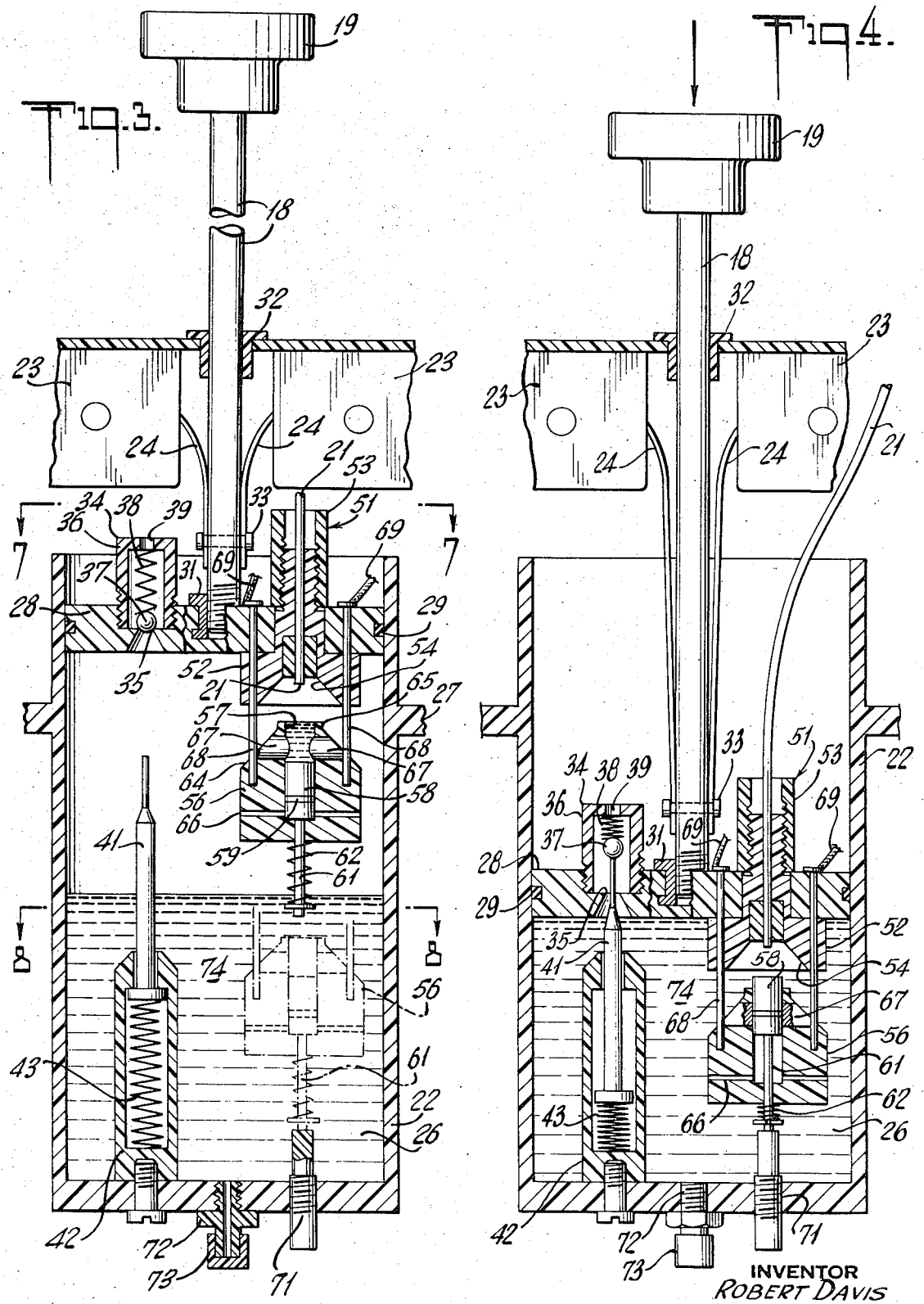

Oct. 24, 1972  R. DAVIS  3,700,411
GAS ANALYZER
Filed April 30, 1971  3 Sheets-Sheet 3
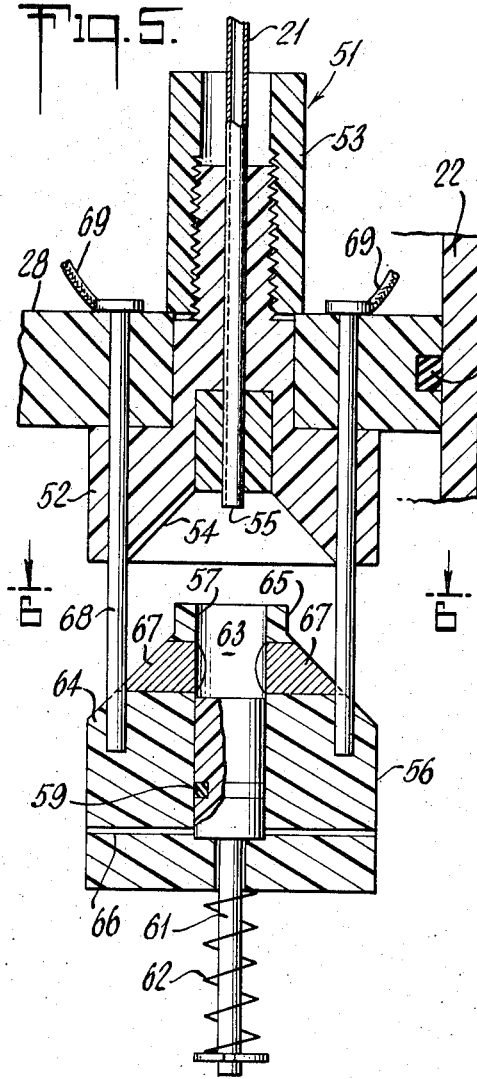
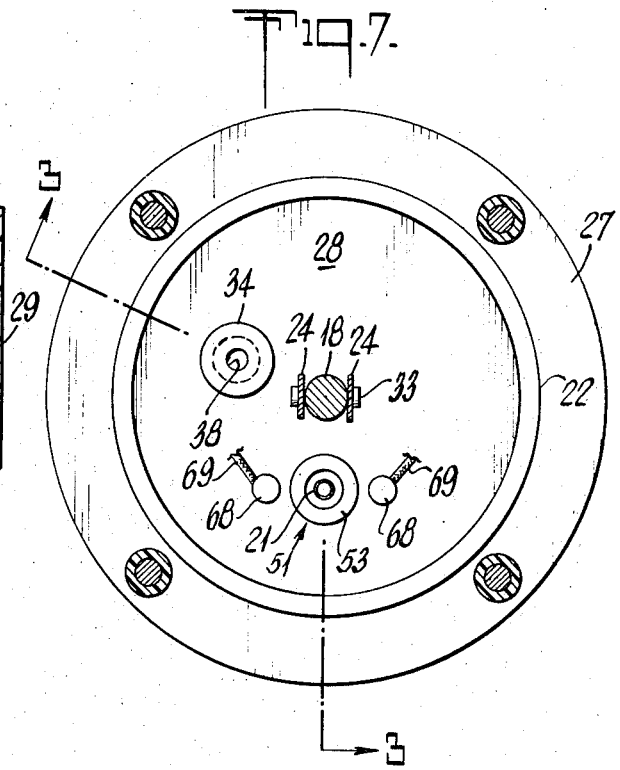
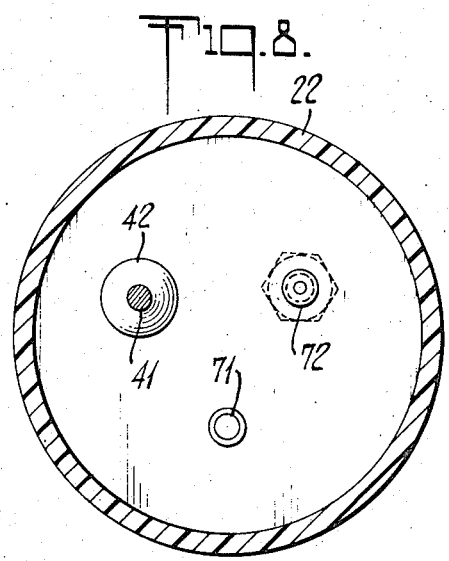
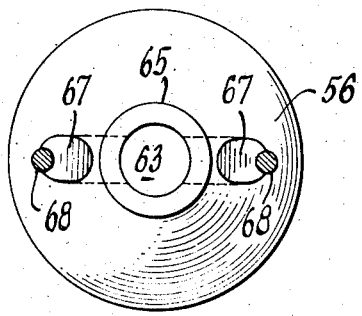
INVENTOR
ROBERT DAVIS
BY
Blum, Moscovitz, Friedman & Kaplan
ATTORNEYS

United States Patent Office 3,700,411
Patented Oct. 24, 1972

3,700,411
GAS ANALYZER
Robert Davis, Far Rockaway, N.Y., assignor to Combustion Equipment Associates, Inc., New York, N.Y.
Filed Apr. 30, 1971, Ser. No. 139,107
Int. Cl. G01n 1/24, 27/06, 31/00
U.S. Cl. 23—254 E
10 Claims

ABSTRACT OF THE DISCLOSURE

A gas analyzer especially suitable as a portable analyzer to accurately measure the quantity of pollutants in the air. Means are provided for accurately sampling a predetermined quantity of air for highly accurate reproducibility of results. The pollutants to be measured are dissolved in a fluid and the conductivity of the fluid is measured and correlated to the quantity of pollutants in the air.

BACKGROUND OF THE INVENTION

This invention relates generally to a gas analyzer and especially to an analyzer for measuring the pollutants in the air. While gas analyzers have taken various forms, analyzers having a high degree of accuracy have generally been relatively large, complex and costly and have not been easily transportable. Portable analyzers have generally suffered from lower accuracy and reproducibility of results.

SUMMARY OF THE INVENTION

Generally speaking, in accordance with the invention, a gas analyzer is provided for sampling environmental air and measuring the quantity of pollutant materials in the air. The analyzer is constructed and arranged to assure sampling of a constant, predetermined volume of gas or air each time the analyzer is operated so that highly accurate and reproducible readings can be expected. Air is drawn in at a constant rate by applying a constant force to a piston and cylinder assembly. A cell of predetermined volume is filled with a fluid and the air or gas drawn into the analyzer is caused to be applied to the fluid so that the pollutants to be measured are dissolved in the fluid thereby changing the conductivity of the fluid. The conductivity may be measured by a suitably calibrated meter which may directly read the proportion of the pollutant in the measured sample.

Accordingly, it is an object of this invention to provide an improved gas analyzer capable of analyzing a gas in a highly accurate manner.

Another object of the invention is to provide an improved gas analyzer capable of providing a constant volume sample for the measurement of pollutants therein.

A further object of the invention is to provide an improved analyzer wherein a gas to be measured is dissolved in a fluid and wherein the gas is delivered to the fluid at a constant rate.

Still another object of the invention is to provvide an improved gas analyzer capable of providing highly accurate results while being readily portable.

Still other objects and advantages of the invention will in part be obvious and will in part be apparent from the specifications and drawings.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of a portable gas analyzer constructed in accordance with a preferred embodiment of the instant invention.

FIG. 2 is an elevational view of certain of the internal component of the analyzer of FIG. 1.

FIG. 3 is a partial sectional view of the fluid chamber and casing showing the internal structural components and operative elements. The FIG. 3 sectional view is taken along line 3—3 on FIG. 7.

FIG. 4 is a partial sectional view similar to FIG. 3 and showing the plunger in a depressed condition.

FIG. 5 is a sectional view, at an enlarged scale, of the fluid cell and air impinging orifice.

FIG. 6 is a sectional view taken along line 6—6 of FIG. 5.

FIG. 7 is a sectional view taken along line 7—7 of FIG. 3; and

FIG. 8 is a sectional view taken along line 8—8 of FIG. 3.

DESCRIPTION OF THE PREFERRED EMBODIMENT

Referring now to FIGS. 1 and 2, a gas analyzer indicated generally at 11 has a casing 12 which mounts the various structural elements. A meter 13 is mounted in the top wall of the casing with a zeroing dial 14 and control switches 15 being shown in positions of accessibility. Also shown is a representation of the circuit board 16 and batteries 17 for operating the instrument. As the invention disclosed and claimed herein is concerned with the air sampling device, a further description of the electronic circuitry is deemed unnecessary.

A plunger 18 having an operating knob 19 extends through the casing for manual operation by the operator and a gas supply tube 21 extends through the casing into the atmosphere. The instrument depicted in the preferred embodiment as represented by FIGS. 1 and 2 may be of a size to be easily transported and may be easily carried about by a handle or shoulder strap. Of course, if monitoring of fixed locations is desired, the instrument need not be made portable.

A chamber 22 is mounted within casing 12 and carries the various operative parts to be hereafter described. Mounting members 23 are carried by the casing above chamber 22 and mount therein constant energy springs 24 whose use will be hereafter described. Chamber 22 acts as a fluid reservoir and may be provided with a drain tube 25 through which the fluid in the reservoir may be drained and refilled.

Referring now to FIGS. 3, 4, 7 and 8, chamber 22 is in the form of a cylinder adapted to be filled with fluid 26 to a predetermined level. As the analyzer disclosed herein is especially suitable for measuring the quantity of sulphur dioxide in the air, the fluid 26 will preferably be a hydrogen peroxide solution. Chamber 22 is provided with a flange 27 for mounting the chamber within the casing in any suitable manner (not shown).

A piston 28 is slidably mounted within chamber 22 and its periphery is sealed against the wall of the chamber by means of an O-ring 29. The lower end of plunger 18 is fixed to piston 28 such as by being threadedly engaged with a threaded sleeve 31 secured within piston 28. For ease of sliding action, plunger 18 passes through a bushing 32 mounted in the top wall of casing 12.

As aforenoted, constant energy springs 24 are secured to the casing through mounting members 23. The free ends of constant energy springs 24 are secured, such as by means of a pin 33, to the plunger 18 adjacent piston 28. The constant energy springs may be of any known type. FIG. 3 depicts the piston in its raised position. When the piston is depressed as shown in FIG. 4, a restoring force is applied thereto through the constant energy springs 24 thereby biasing the piston to the raised position with the biasing force remaining substantially constant as the piston returns from the depressed (FIG. 4) to the normal (FIG. 3) position.

A valve 34 consists of a seat 35 formed in the surface of piston 28, a housing 36 surrounding the seat, a ball 37, a spring 38 biasing the ball toward the seat and an aperture 39. Valve 34 is normally closed and is only operated when piston 28 is in a lowered position as will now be described.

An operating rod 41 is slidably mounted in a tube 42 fixed to the bottom wall of chamber 22. A spring 43 biases operating rod 41 upwardly as in apparent in FIG. 3. Operating rod 42 is disposed opposite ball 37 for displacement of the ball for reasons that will hereinafter become evident.

A measuring unit generally indicated at 51 is also mounted to piston 28. A first block 52 is mounted through the piston and secured thereto by means of a sleeve 53. A recess 54 in the form of a truncated cone faces downwardly with gas supply tube 21 passing through block 52 and terminating in recess 54. Gas supply tube 21 has a through passage 55 defining a critical orifice at its terminus within recess 54.

Disposed opposite recess 54 is a second block 56 having a bore 57 in the top surface thereof. Bore 57 is generally cylindrical and has mounted therein a piston 58 encircled by an O-ring 59. A rod 61 extends downwardly from piston 58 and extends through second block 56. A spring 62 biases piston 58 to a lowered position whereby bore 57 defines a fluid cell 63.

The upper end of second block 56 has a generally cone shaped surface 64 terminating in an annular lip 65. A relief passage 66 communicates with the lower end of bore 57 to permit piston 58 to readily slide in opposite directions within bore 57.

Second block 56 is mounted in fixed relation to first block 52. In a preferred embodiment, conductive rods 68 are fixedly mounted through piston 28 and have first block 52 and second block 56 fixedly mounted thereon. Leads 69 can be connected to conductive rods 68 for connection to the electric circuitry (not shown). Disposed within second block 56 are electrodes 67 which make electrical contact with conductive rods 68 and also have ends thereof exposed within fluid cell 63.

A post 71 is threadedly secured through the bottom wall of chamber 22 in a position opposite rod 61. The position of post 71 may be adjusted. The bottom wall of chamber 22 may also carry a drain plug 72 with a removable cap 73 or a drain tube 25 as shown in FIG. 2 may be fixed over drain plug 72 and the outer end of post 71 can be used to close the drain tube 25 when not in use.

The operation of the gas analyzer may now be understood. Assuming that the analyzer is to be used for measuring the sulphur dioxide content of a sample of air, chamber 22 would be filled to a predetermined level with an acidified solution of hydrogen peroxide. The solution or liquid is generally indicated at 74. Prior to operation, piston 28 is in the FIG. 3 position and air is located within chamber 22 above solution 74. An operator physically depresses plunger 18 through knob 19 and, during the initial downward travel of piston 28, air is expelled from the chamber through gas supply tube 21. However, during the downward travel of piston 28, operating rod 41 will strike ball 37 and, as the force of spring 38 is less than the force of spring 43, ball 37 will be raised off of seat 35 to permit the air to escape through aperture 39. When spring 38 is fully compressed, spring 43 will become compressed thereby permitting sufficient relative movement between operating rod 41 and valve 34 to permit piston 28 to be fully depressed to the FIG. 4 position. As the piston is depressed, second block 56 moves downwardly and, when it reaches the phantom line position shown in FIG. 3, rod 61 engages post 71 thereby driving upwardly piston 58 to flush all of the solution remaining in fluid cell 63. Thus, as shown in FIG. 4, in the fully depressed condition of piston 28, the piston 58 has cleared fluid cell 63 of all solution. In the FIG. 4 position 28 is biased upwardly by constant energy springs 24.

The gas analyzer is now ready to analyze a sample of gas. Plunger 18 is released and, due to the opened condition of valve 34, air can freely pass through piston 28 whereby the piston rises rapidly and, in effect, jumps out of solution 74 to a predetermined position. This position is determined by the point at which rod 41 no longer contacts ball 37 and valve 34 thereby closes. At such instant, air can only enter or pass through the piston through gas supply tube 21 and, since a vacuum would otherwise be formed within chamber 22, the piston rises very slowly as air enters through gas supply tube 21.

During the time that piston 28 jumped up while valve 34 was open, piston 58 moved downwardly to define fluid cell 63 and the fluid cell picked up fluid from solution 74 so that it would be filled with a fresh batch of fluid as shown in FIG. 3. It should be noted that, when the piston was depressed in the FIG. 4 position, the orientation of recess 54 caused an air bubble to be formed within the recess in order to keep the end of gas supply tube 21 dry to minimize possible erroneous readings.

After valve 34 closes on the upward stroke of piston 28, a sample of air or gas enters through gas supply tube 21 at a controlled rate. The rate is dependent on the cross sectional dimension of through passage 55, the forces supplied by constant energy springs 24 and friction between piston 28 and the walls of chamber 22 through O-ring 29.

As piston 28 rises and the sample of gas is drawn through gas supply tube 21, a jet of gas is delivered out of the free end of through passage 55 and directed against the sample of fluid in fluid cell 63. The impingement of the jet on the surface of the fluid in the cell causes a depression which sets up a circulation pattern that encompasses the entire liquid volume. Any sulphur dioxide in the sample is dissolved in the hydrogen peroxide solution whereby a mild solution of sulphuric acid is formed. Sulphuric acid is conductive and the resistance of the fluid in the cell can be measured by applying a potential across electrodes 67. The resistance of the cell would be read on meter 13 and an appropriately calibrated scale would indicate the percentage of sulphur dioxide in the air sample.

The specific configuration of the upper end of second block 56 aids in assuring accuracy of measurement. By providing the annular lip 65 projecting upwardly from cone shaped surface 64, excess fluid will drain from fluid cell 63 so that, each time the analyzer is operated, a precisely predetermined quantity of fluid will fill the fluid cell. Also, by forming second block 56 from a non-wettable plastic material, greater accuracy in the quantity to fluid in the fluid cell will result.

The provision of means permitting piston 28 to rapidly move upwardly is especially suitable for a portable analyzer where the quantity of solution 74 may vary or may slosh around. Also, in a portable, manually operated analyzer, the amount of plunger depression may vary from cycle to cycle and the quick return will prevent variations in reading as a result in variations in plunger depression. Stated otherwise, regardless of the amount of plunger depression, or volume or level of the solution, the volume of gas entering as a jet through gas supply tube 21 will remain constant from cycle to cycle.

During measurement, it may also be desirable to multiply or accumulate measurements. This can be accomplished with the analyzer hereinabove described by depressing the plunger until at least valve 34 is operated without completely submerging second block 56 and operating piston 58 whereby the fluid in fluid cell 63 will not be purged and an additional amount of sulphur dioxide will be dissolved in the sulphuric acid within the fluid cell.

If the analyzer is to be mounted in a fixed position rather than being portable, mechanical means (not shown) could be provided for operating plunger 18 by a predetermined amount for each cycle of operation whereby valve 34 could be eliminated. Also, if desired, the jet formed as a critical orifice at the end of gas supply tube 21 could terminate within fluid cell 63 for bubbling the measured sample through the fluid in the fluid cell.

Constant energy springs have been disclosed as connected to piston 28 for biasing the piston. However, it will be understood that the position of the piston could be fixed with the position of chamber 22 movable. If chamber 22 were movable vertically with piston 28 fixed, the downward movement of the chamber could be effected by the constant energy of gravity.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A gas analyzer comprising a chamber partially filled with a fluid, a piston slidably mounted in said chamber and movable toward and from a wall of said chamber, said piston and chamber defining an assembly, first means cooperatively connected to said assembly for advancing said piston and said wall of said chamber toward one another for expelling gas from said chamber, second means cooperatively connected to said assembly for retracting said piston and said wall away from one another at a controlled rate, means carried by said piston for defining a critical orifice for receiving therethrough a sample of gas from a source externally of said chamber and introducing the sample into said chamber during retraction, means carried by said piston for defining a fluid cell for receiving a predetermined quantity of said fluid from the fluid in said chamber during advancement, mounting means positioning said fluid cell defining means within said chamber adjacent said critical orifice, and means for applying a potential across said fluid cell defining means for measuring changes in the state of fluid in said fluid cell.

2. A gas analyzer as claimed in claim 1 wherein said means defining said critical orifice includes a downwardly facing recess having the lower edge thereof extending below the terminus of said critical orifice whereby to form a gas bubble over the terminus of said critical orifice to prevent wetting of the terminus of said critical orifice when said means defining said critical orifice is submerged in said fluid.

3. A gas analyzer as claimed in claim 1 wherein said means defining a fluid cell includes an upwardly facing annular lip.

4. A gas analyzer as claimed in claim 3 wherein said means defining said fluid cell further includes a generally cone shaped surface extending downwardly from said annular lip.

5. A gas analyzer as claimed in claim 1 wherein said means defining said fluid cell is fabricated of a non-wettable plastic material.

6. A gas analyzer as claimed in claim 1 wherein said means defining said fluid cell includes purging means for purging said fluid cell of said predetermined quantity of said fluid when said piston and said wall of said chamber are advanced toward one another.

7. A gas analyzer as claimed in claim 1 wherein said second means includes constant energy springs acting between said piston and said chamber.

8. A gas analyzer as claimed in claim 1 and further including a normally closed valve carried by said piston and operating means carried by said chamber for operating said normally closed valve when said means defining said fluid cell is submerged in the fluid partially filling said chamber.

9. A gas analyzer as claimed in claim 1 wherein said means for applying a potential includes at least two electrodes having surfaces thereof exposed within said fluid cell.

10. A gas analyzer as claimed in claim 9 wherein said mounting means includes conductive rods having ends mounted in said piston and opposite ends electrically connected to said electrodes.

References Cited
UNITED STATES PATENTS

| | | | |
|---|---|---|---|
| 2,789,887 | 4/1957 | Cruikshank | 23—254 E |
| 2,795,756 | 6/1957 | Jacobson et al. | |
| 3,031,272 | 4/1962 | Agerbek-Poulsen et al. | 23—254 E |
| 3,123,444 | 3/1964 | Foxwell et al. | 23—254 R |
| 3,572,998 | 3/1971 | Anthon | 23—253 R |

OTHER REFERENCES

Perry's Chemical Engineers' Handbook, p. 401, 3rd Ed. 1950). (TP155P4.)

Perry's Chemical Engineers' Handbook, pp. 5–8 thru 5–12, 4th Ed. (1963).

JOSEPH SCOVRONEK, Primary Examiner

U.S. Cl. X.R.

23—253 R, 259; 73—421.5 R